UNITED STATES PATENT OFFICE.

CONRAD SCHROEDER, LOUIS E. LEVI, AND ALFRED J. M. LASCHE, OF MILWAUKEE, WISCONSIN.

COATING FOR THE TIPS OF CIGARS.

951,582.      Specification of Letters Patent.      Patented Mar. 8, 1910.

No Drawing.      Application filed May 21, 1909. Serial No. 497,548.

*To all whom it may concern:*

Be it known that we, CONRAD SCHROEDER, LOUIS E. LEVI, and ALFRED J. M. LASCHE, residing in Milwaukee, in the county of Milwaukee and State of Wisconsin, have invented new and useful Improvements in Coatings for the Tips of Cigars, of which the following is a description.

The object of our invention is to provide a waterproof coating for the tips of cigars, having the quality of being substantially non-brittle or pliant and not subject to scaling or cracking, and at the same time possessing the desirable qualities of preventing, to a large extent, oils from the tobacco from passing into the mouth, and also preventing disagreeable taste of the tobacco, and the discoloration of the teeth.

The coating which we employ for the tips of cigars consists of a cellulose compound, and inorganic salt of a fatty acid, a balsam, and an ingredient to effect dissolving of the other elements, such as alcohol. The cellulose compound may be soluble cellulose, such as dinitrocellulose, acetylcellulose, or any acetyl ester of cellulose, or cellulose xanthates, tricetylcellulose, oxycellulose.

The inorganic salt of a fatty acid may be calcium caprylate, barium caprylate, strontium caprylate, magnesium stearate, calcium oleate, calcium lineoate, calcium recinoleate.

The balsam may be Venice turpentine, Canada balsam, Peru, tolu, copaiba.

The ingredient to effect dissolving may be alcohol used alone, or ether in lieu thereof, or both together.

In the preferred form of our compound, we employ a collodion as the cellulose compound; calcium recinoleate as the inorganic salt of a fatty acid; Venice turpentine, as the balsam, and alcohol or ether, or both as the other ingredient. We do not, however, wish to limit ourselves to these particular elements or ingredients, as any of the other equivalents thereof which have been mentioned may be substituted.

The above enumerated ingredients are preferably, although not necessarily, mixed in the following proportions, viz; a collodion 40 cubic centimeters, calcium recinoleate 1 gram, Venice turpentine 1 cubic centimeter, and alcohol 8 cubic centimeters.

In preparing the compound, the calcium resinoleate, the Venice turpentine and the alcohol are combined and heated for a sufficient length of time to permit the calcium recinoleate to dissolve. After this, the mixture is cooled and the collodion is added. The tips of the cigars are now dipped in the bath thus produced, and by reason of the particular composition of the compound a pasty cement is formed which adheres to and covers the ends of the cigars in a thin coating, and forms a covering which is not only waterproof, but is also sufficiently pliable as to give with the cigar when the cigar is placed between the lips or teeth and compressed, or when the cigar is moist and subsequently shrinks in drying, without the slightest danger of cracking or scaling off.

The improved coating furthermore prevents the wrapper of the cigar from unwrapping by reason of looseness which ordinarily arises from handling, or otherwise.

If it is desired that the coating should be colored, a suitable coloring matter, such as bronze powder, or a powdered inert substance not soluble, is added to the solution above described.

The use of a cellulose compound, such as collodion or any of the other equivalents enumerated, is necessary in order to form the film or coating.

An inorganic salt of an organic acid, such as calcium recinoleate, or any of the other mentioned equivalents thereof is employed, in order to render the coating strong, non-breakable and at the same time flexible. A balsam, such as Venice turpentine, or the mentioned equivalents, is employed in order to also give flexibility. Alcohol or ether or both may be used in order to dissolve the other elements.

If for any reason it is desired to render the coating still more flexible, gums, or a resinous substance, such as damar, elemi, sandarach, mastic, shellac, gutta-percha, or chicle may be employed, in about the same proportion as the calcium recinoleate. Furthermore, an oil such as castor oil may be added to the collodion, in order to render this substance flexible.

What we claim as our invention is:

1. A coating composition for the tips of cigars, consisting of a cellulose compound, an inorganic salt of a fatty acid, a balsam, and a solvent.

2. A coating composition for the tips of cigars, consisting of a collodion, calcium recinoleate, Venice turpentine and alcohol.

3. A coating composition for the tips of cigars, consisting of a collodion 40 cubic centimeters, calcium recinoleate 1 gram, Venice turpentine 1 cubic centimeter, and alcohol 8 cubic centimeters.

4. A coating composition for the tips of cigars, consisting of a cellulose compound, an inorganic salt of a fatty acid, a balsam, a solvent, and a coloring matter.

5. A coating composition for the tips of cigars, consisting of a cellulose compound, an inorganic salt of a fatty acid, a balsam, a resinous substance, and a solvent.

6. A coating for the tips of cigars, consisting of a cellulose compound with an oil added thereto, an inorganic salt of a fatty acid, a balsam, and a solvent.

In testimony whereof, we affix our signatures, in presence of two witnesses.

CONRAD SCHROEDER.
LOUIS E. LEVI.
ALFRED J. M. LASCHE.

Witnesses:
A. L. Morsell,
Anna F. Schmidtbauer.